(12) United States Patent
Leon

(10) Patent No.: US 6,986,944 B2
(45) Date of Patent: *Jan. 17, 2006

(54) CORE-SHELL NITRO-RESIN PARTICLES AND METHOD OF PREPARATION

(75) Inventor: Jeffrey W. Leon, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 10/441,383

(22) Filed: May 20, 2003

(65) Prior Publication Data

US 2004/0234764 A1 Nov. 25, 2004

(51) Int. Cl.
  *B32B 5/16* (2006.01)

(52) U.S. Cl. .................. 428/403; 428/407; 525/902
(58) Field of Classification Search ................ 428/403, 428/407; 525/902
See application file for complete search history.

(56) References Cited

U.S. PATENT DOCUMENTS

| | | | |
|---|---|---|---|
| 3,953,386 A | | 4/1976 | Murphy et al. |
| 3,977,922 A | * | 8/1976 | Inoue et al. .................... 149/2 |
| 4,290,847 A | * | 9/1981 | Johnson et al. ............. 376/103 |
| 4,659,334 A | * | 4/1987 | Matlach ........................ 44/346 |
| 4,670,250 A | * | 6/1987 | Baker .......................... 424/419 |
| 4,970,247 A | | 11/1990 | Hoppe et al. |
| 5,011,874 A | | 4/1991 | Hoppe et al. |
| 5,324,617 A | | 6/1994 | Majima et al. |
| 3,265,767 A | | 8/1996 | Caldwell et al. |
| 5,547,999 A | * | 8/1996 | Satake et al. ............... 522/122 |
| 6,106,996 A | | 8/2000 | VanDamme et al. |
| 6,110,645 A | | 8/2000 | DeBoer et al. |
| 6,428,805 B1 | * | 8/2002 | Dohi et al. .................. 424/434 |
| 6,521,342 B1 | * | 2/2003 | Hutter et al. ............... 428/407 |
| 6,572,969 B1 | * | 6/2003 | Samaranayake ............ 428/407 |

FOREIGN PATENT DOCUMENTS

| | | |
|---|---|---|
| EP | 0 514 145 A1 | 11/1992 |
| EP | 1 229 057 A2 | 8/2002 |
| GB | 1443289 | 7/1976 |

\* cited by examiner

*Primary Examiner*—H. Thi Le
(74) *Attorney, Agent, or Firm*—Ji Lanny Tucker

(57) ABSTRACT

Combustible core-shell particles have a nitro-resin core that is covered by an addition polymer shell in a weight ratio of from 20:1 to 0.2:1 (core:shell). The shell polymer is derived from one or more ethylenically unsaturated polymerizable monomers that are represented by the following Structure I:

$$CH_2=C(R)\text{-}X \qquad (I)$$

wherein R is hydrogen or methyl, and X is any monovalent moiety except a phenyl group. These combustible core-shell particles are particularly useful in thermal imaging materials such as "direct-write" printing plate precursors.

22 Claims, No Drawings

CORE-SHELL NITRO-RESIN PARTICLES AND METHOD OF PREPARATION

CROSS REFERENCE TO RELATED APPLICATIONS

Reference is made to copending and commonly assigned U.S. Ser. No. 10/441,547 filed on even date herewith by Leon and McCovick and entitled "THERMAL IMAGING MATERIAL WITH COMBUSTIBLE NITRO-RESIN PARTICLES".

FIELD OF THE INVENTION

This invention relates to compositions of matter that are in the form of combustible or thermoplastic core-shell particles, and to a method of preparing them. These particles have utility, for example, in thermal imaging materials. This invention also relates to a method or preparing these core-shell particles.

BACKGROUND OF THE INVENTION

Aqueous dispersions of polymeric particles have been prepared for decades using various emulsion and suspension polymerization techniques. Such dispersions can be used in various industrial applications because they can be dried to form films or coatings having various desired properties. For example, dispersions of core-shell particles in which the cores contain cellulose esters homogeneously mixed with acrylate polymers are described in U.S. Pat. No. 4,970,247 (Hoppe et al.).

It also known to prepare dispersions of thermoplastic particles using various polymerizable monomer starting materials. For example, U.S. Pat. No. 5,324,617 (Majima et al.), U.S. Pat. No. 6,106,996 (Van Damme et al.) and EP 0 514 145A1 (Matthews et al.) describes thermoplastic particles for use in various thermal imaging materials such as thermal materials used to make printing plates.

U.S. Pat. No. 5,324,617 (Majima et al.) describes printing materials containing self-combustible nitrocellulosic materials that are encapsulated within a polystyrene resin. When contracted with IR-radiation, portions of the materials combust to form an image.

There is a need for thermally combustible particles for which such critical properties as particle diameter, particle size distribution, solvent dispersibility, surface functions, glass transition temperature, and coalescence properties can be finely designed to fit the needs of specific uses.

SUMMARY OF THE INVENTION

The present invention provides a combustible core-shell particle having a core comprising a nitro-resin and a shell around the core, the shell comprising an addition polymer derived, at least in part, from one or more ethylenically unsaturated polymerizable monomers that are represented by the following Structure I:

$$CH_2=C(R)—X \qquad (I)$$

wherein R is hydrogen or methyl, and X is any monovalent moiety except a phenyl group, wherein the weight ratio of the nitro-resin core to the addition polymer shell is from about 20:1 to about 0.2:1.

In preferred embodiments, the present invention provides a combustible core-shell particle having a core comprising a nitrocellulose and an addition polymer shell around the core, the addition polymer shell comprising, at least in part, a poly(acrylate or methacrylate) or poly(acrylamide or methacrylamide) and wherein the weight ratio of the nitrocellulose core to the polymeric shell is from about 5:1 to about 0.5:1.

In addition, this invention provides a method of making the combustible core-shell particle described above, the method comprising:

A) preparing an aqueous surfactant-stabilized dispersion of particles of the nitro-resin, and B) providing an addition polymer shell around the nitro-resin particles by emulsion polymerizing the one or more monomers represented by Structure I on the nitro-resin particles.

The particles of the present invention provide advantages particularly when they are used in thermal imaging materials such as "direct-write" lithographic imaging materials. They are less ablatable during thermal imaging and by modifying the composition of the addition polymer shell, the physical properties of the imaged areas can be readily modified as desired. When thermally imaged, the heat generated by the nitrocellulose core serves to better coalesce the shells leading to a tougher and more chemically resistant image. In addition, the introduction of highly polar surface functionalities in the addition polymer surface of the particles improves the wash-off of the non-imaged regions. Thus, the discrimination between imaged and non-imaged regions of resulting lithographic printing plates is improved.

Thus, a main advantage of the method of preparation of this invention is the ability to control particle size and other particle properties. Furthermore, the present invention provides core-shell particles having cores that are composed entirely of a nitro-resin such as nitrocellulose, in contrast to U.S. Pat. No. 4,970,247 (noted above) having hybrid polymer cores.

DETAILED DESCRIPTION OF THE INVENTION

The nitro-resin in the core-shell particles of the present invention is "combustible" and not "coalescible". This means that greater than 25% (preferably greater than 90%) of the weight of the nitro-resin core is lost (as measured by thermogravimetric analysis via an oxidative or autoxidative pathway) during heating. Thus, it is considered that the particles of this invention are not "thermoplastic" materials because at least some of the particles is combustible. Completely thermoplastic materials are known in the art to be materials that undergo no chemical change when heated to a temperature where "flow" can occur.

In addition, it is essential that the core-shell particles of the present invention be composed of specific core and shell materials. The core is composed of a "nitro-resin" that is a self-combustible material and includes nitrocellulose and other nitrate esters of cellulosic materials (or carbohydrates) known in the art. Nitrocellulose is the preferred nitro-resin used in the present invention. A mixture of nitro-resins can also be used as the "core" of the particles of the present invention. The nitro-resins can be obtained from a number of commercial sources including Synthesia and Hercules Companies, or they can be prepared using starting materials and procedures known to a skilled polymer chemist. Surrounding at least 50% (surface area), and preferably 80% (surface area), and most preferably 100% (surface area) of the core, is an addition polymer shell that is derived from one or more water-insoluble ethylenically unsaturated polymerizable monomers (except styrene and styrene derivatives because their free radical polymerization is largely quenched by the presence of nitrocellulose).

More particularly, these one or more monomers are represented by the following Structure I:

$$CH_2=C(R)—X \qquad (I)$$

wherein R is hydrogen or methyl, and preferably R is hydrogen.

X is any monovalent moiety except a phenyl group. For example, X can be an alkyl ester, alkyl amide, aryl ester, or aryl amide group wherein the alkyl group is substituted or unsubstituted and comprises 1 to 16 carbon atoms (preferably from 1 to 6 carbon atoms), and the aryl group is substituted or unsubstituted and comprises 6 to 10 carbon atoms in the aromatic ring. Preferably, X is an alkyl ester or alkyl amide wherein the alkyl group is substituted or unsubstituted and has from 1 to 6 carbon atoms. Preferably, at least 90% by weight of the water-insoluble monomers used in this invention will have X moieties comprise less than 7 carbons.

Representative substituents on the noted alkyl or aryl groups include, but are not limited to, methyl, ethyl, isopropyl, n-propyl, n-butyl, iso-butyl, t-butyl, neo-pentyl, phenyl, benzyl, cyclohexyl, iso-bornyl, and 2-ethylhexyl.

Representative monomers represented by Structure I include, but are not limited to, methyl acrylate, methyl methacrylate, ethyl acrylate, ethyl methacrylate, t-butyl methacrylate, iso-propyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, cyclohexyl acrylate, 3-methacryloxypropyl-dimethylmethoxysilane, 3-methacryloxypropyl-methyldimethoxysilane, 3-methacryloxypropyl-pentamethyldisiloxane, 3-methacryloxypropyltris-(trimethylsiloxy)silane, 3-acryloxypropyl-dimethylmethoxysilane, acryloxypropylmethyldimethoxysilane, trifluoromethyl acrylate, trifluoromethyl methacrylate, tetrafluoropropyl acrylate, tetrafluoropropyl methacrylate, heptafluorobutyl methacrylate, iso-butyl acrylate, iso-butyl methacrylate, 2-ethylhexyl acrylate, 2-ethylhexyl methacrylate, iso-octyl acrylate, iso-octyl methacrylate, N-t-butyl acrylamide, N-isopropyl acrylamide, N-cyclohexyl acrylamide, N-phenyl acrylamide, N,N-dihexyl acrylamide, N,N-dioctyl acrylamide, vinyl propionate, vinyl acetate, vinyl butyrate, methyl methacrylate, methyl acrylate, glycidyl acrylate, glycidyl methacrylate, vinyl 4-phenylpyrrolidone, allyl methacrylate, allyl acrylate, butenyl acrylate, undecenyl acrylate, undecenyl methacrylate, vinyl acrylate, and vinyl methacrylate. Preferred water-insoluble monomers are acrylate esters or with 4–9 carbons or acrylamides with 5–13 carbons.

Mixtures of two or more monomers can be used if desired.

Particularly useful monomers represented by Structure I are t-butyl acrylate, phenyl acrylate, and sodium sulfopropyl acrylate.

Also (and indeed preferably), the addition polymer shell can be comprised of a "copolymer" that includes recurring units derived from two or more different ethylenically unsaturated polymerizable monomers, as long as at least one of those monomers is represented by Structure I. Such addition copolymers are included in the following Structure II (that also include addition polymers derived solely from monomers of Structure I):

$$-(A)_x-(B)_y- \qquad (II)$$

wherein "A" represents recurring units derived from said or more ethylenically unsaturated polymerizable monomers defined by Structure I, "B" represents recurring units derived from one or more "additional" ethylenically unsaturated polymerizable monomers, "x" represents from about 80 to 100 mol % (preferably from about 90 to 100 mol %), and "y" represents from 0 to about 20 mol % (preferably from 0 to about 10 mol %), based on total moles of recurring units.

The "additional" ethylenically unsaturated polymerizable monomers can be any ethylenically unsaturated polymerizable monomer other than those represented by Structure I. Such monomers include, but are not limited to, water-soluble or crosslinking ethylenically unsaturated polymerizable monomers.

Water-soluble monomers include but are not limited to, negatively or positively charged ethylenically unsaturated polymerizable monomers as well as hydroxy-containing ethylenically unsaturated polymerizable monomers. Such negatively or positively charged ethylenically unsaturated polymerizable monomers can comprise one or more carboxy, phospho, sulfonato, sulfo, quaternary ammonium, sulfonium, phosphonium, or polyethylene oxide groups in the molecule. Particularly, useful water-soluble monomers are those containing sulfonato or quaternary ammonium groups. Water-soluble monomers may include, but are not necessarily limited to, vinyl 4-methylimidazole, acrylamide, methacrylamide, N,N-dimethyl acrylamide, N-methyl acrylamide, N-methyl methacrylamide, N-methyl acrylamide, N-methyl methacrylamide, and N,N-dimethyl acrylamide acrylic acid, methacrylic acid, chloromethacrylic acid, maleic acid, diallylamine, vinyl sulfonamide, sodium acrylate, sodium methacrylate, ammonium acrylate, ammonium methacrylate, acrylamidopropanetriethylammonium chloride, methacrylamidopropane-triethylammonium chloride, vinyl-pyridine hydrochloride, sodium vinyl phosphonate, sodium 1-methylvinylphosphonate, sodium vinyl sulfonate, sodium 1-methylvinyl-sulfonate, sodium styrenesulfonate, sodium acrylamidopropanesulfonate, sodium methacrylamidopropanesulfonate, sodium vinyl morpholine sulfonate, poly(ethylene glycol acrylate), poly(ethylene glycol methacrylate), hydroxyethyl acrylate, and hydroxyethyl methacrylate. Preferred water-soluble monomers include acrylic acid and its salts, acrylamide, and acrylate esters containing ionic groups.

Useful crosslinking monomers include compounds containing two or more ethylenically unsaturated polymerizable groups. Useful crosslinking monomers include esters of saturated glycols or diols with unsaturated monocarboxylic acids, such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate, hexanediacrylate, cyclohexanedimethanoldivinyl ester, trimethylolpropane diacrylate, trimethylolpropane dimethacrylate, methylenebisacrylamide, polyethylene glycol diacrylate, and polyethylene glycol dimethacrylate. Preferred monomers are compounds containing more than one acrylamide or more than one acrylate moiety (that is, polyacrylates, polyacrylamides, polymethacrylates, and polymethacrylamides), such as methyl enebisacryl amide, ethylene glycol diacrylate, or hexanediacrylate.

Still other additional ethylenically unsaturated monomers from which "B" in Structure II can be derived are iso-prene, acrylonitrile, vinyl ethers, vinyl halides, butadiene, vinyl ketones, N-alkyl and N-aryl maleimides.

The various ethylenically unsaturated polymerizable monomers from which "B" can be derived are generally available from a number of commercial sources such as Aldrich Chemicals or Polysciences, or they can be prepared using starting materials and procedures known to a skilled polymer chemist.

The preferred addition polymers used to form the addition polymer shell comprise from about 80 to about 100 mol % of recurring units derived from one or more water-insoluble acrylate ester or water-insoluble N-substituted acrylamide, from about 2 to about 10 mol % of recurring units derived from a water-soluble acrylate or acrylamide, and from 0 to about 10 mol % of recurring units derived from an acrylate or acrylamide crosslinking monomer.

The non-nitro-resin component (that is, the addition polymer) in the combustible core-shell particles of the present invention preferably has a glass transition temperature of from about 25 to about 150° C., and most preferably of from about 40 to about 120° C. Glass transition temperature is a well known polymer parameter that can be measured using known procedures and equipment as described for example, in Turi, *Thermal Characterization of Polymeric Materials*, $2^{nd}$ Ed., Academic Press, 1997.

In addition, the particles of this invention are generally spherical in shape and have an average size (for example, diameter) of from about 0.03 to about 2.0 μm (preferably from about 0.03 to about 0.50 μm). The particle size can be measured using known equipment and procedures (such as the Mie scattering or photon correlation spectroscopy methods or by optical or electron microscopy). The particles may not be perfectly spherical and the size would then refer to the largest dimension.

In general, the particles have a distribution of core and addition polymer shell components that are defined by a weight ratio of the core nitro-resin to the addition polymer shell of from about 0.2:1 to about 20:1, and preferably from about 0.5:1 to about 5:1.

The combustible core-shell particles of the present invention can be prepared in a number of ways, but a preferred method includes preparing an aqueous surfactant-stabilized dispersion of nitro-resin particles. This can be done, for example, by solvent evaporation techniques. This involves first forming a solution of nitrocellulose in a water-immiscible solvent in which it is soluble, and then suspending the nitrocellulose-solvent solution in water containing a suitable surfactant. The resulting suspension is subjected to high shear mixing to reduce the size of the polymer-solvent droplets. The shearing action is optionally stopped and the resulting polymer-solvent droplets may optionally coalesce to the extent allowed by the dispersant to form coalesced polymer-solvent droplets. The solvent is removed from the drops to form solidified polymer particles that are then optionally isolated from the suspension by filtration, sedimentation, centrifugation or other suitable means. Optionally, excess surfactant or other impurities can be removed by dialysis or ultrafiltration. Preferably, the particles are maintained as an aqueous dispersion. The nitrocellulose dispersion may have a solids concentration of from about 2 to about 50%. Preferably, the dispersion will have from about 5 to about 30% solids.

Any suitable solvent that will dissolve the nitrocellulose and that is also immiscible with water may be used, such as for example, chloromethane, dichloromethane, ethyl acetate, n-propyl acetate, iso-propyl acetate, vinyl chloride, methyl ethyl ketone (MEK), trichloromethane, carbon tetrachloride, ethylene chloride, trichloroethane, toluene, xylene, cyclohexanone, 2-nitropropane and others readily apparent to one skilled in the art. Preferred solvents includes n-propyl acetate, iso-propyl acetate, ethyl acetate and methylene chloride. Particularly preferred is n-propyl acetate or ethyl acetate.

By high shear mixing, it is meant that sufficient shearing energy is provided at approximately a rate of shear or velocity gradient of $10^5$ $min^{-1}$ or greater, more preferably $10^6$ $min^{-1}$ or greater. By rate of shear is meant a value obtained by dividing an absolute value of a difference of speeds of two planes by a distance between said two planes. A high-pressure homogenizer operated at 9653 kPa provides a rate of shear approximately equal to $6\times10^6$ $min^{-1}$. High-pressure homogenizers are preferred. Emulsification can be performed using methods and devices widely used in the art including, but not necessarily limited to, a high speed blade mixer, a chemical blender, a rotor stator device such as a Silverson mixer or high pressure homogenizer such as a Manton-Gaulin Homogenizer, a Sonolator, a probe sonicator, or a Microfluidizer®. A preferred emulsification device is the Model No. 110T Microfluidizer® produced by Microfluidics Manufacturing.

Suitable surfactants for this solvent evaporation process can be cationic, nonionic, zwitterionic, or anionic compounds and will typically have a hydrophile-lipophile balance that is greater than 8. The hydrophile-lipophile balance (HLB) parameter is defined in Griffin, W. C. *J. Soc. Cosmetic Chemists* 1949, 1, 311 and in Griffin, W. C *J. Soc. Cosmetic Chemists* 1954, 5, 249. There exist a tremendous number of known surfactants. Good reference sources for surfactants are the *Surfactant Handbook* (GPO: Washington, D.C., 1971) and *McCutcheon 's Emulsifiers and Detergents* (Manufacturing Confectioner Publishing Company: Glen Rock, 1992). Useful surfactants will generally have a solubility or dispersibility in water or in a mixture of water and one or more water-miscible solvents. Some examples include, but are not necessarily limited to sodium dodecylsulfate, sodium dodecylbenzenesulfonate, sulfosuccinate esters, such as those sold under the AEROSOL® trade name, flourosurfactants, such as those sold under the ZONYL® and FLUORAD® trade names, sulfonated alkyl-substituted diphenyl ethers, such as those sold under the DOWFAX® trademark, ethoxylated alkylphenols, such as TRITON® X-100 and TRITON® X-705, ethoxylated alkylphenol sulfates, such as RHODAPEX® CO-436, phosphate ester surfactants such as GAFAC® RE-90, quaternary ammonium compounds such as hexadecyltrimethylammonium bromide and Uniquat® CB-50 (available from Lonza Inc., Switzerland), polyoxyethylenated long-chain amines and their quaternized derivatives, ethoxylated silicones, alkanolamine condensates, polyethylene oxide-copolypropylene oxide block copolymers, such as those sold under the PLURONIC® and TECTRONIC® trade names, hydrophobe-end capped oligoacrylamides, such as those described in U.S. Pat. No. 6,127,453 (Erdtmann et al.), N-alkylbetaines, N-alkyl amine oxides, and alkylnaphthalenesulfonate salts, such as Alkanol XC® (available from E.I. DuPont de Nemours & Co.).

Once the core nitro-resin particles are prepared, they are included in a polymerization reaction medium wherein the monomers of Structure I (or Structure II) are incorporated, and free radical polymerization of the monomers is then initiated to form a covering or shell at least partially (preferably entirely) around the nitro-resin particles.

In accordance with the above-described process, the monomer(s) are added to the dispersion of nitrocellulose core particles continuously. The duration of the addition time depends on the types of monomers and reaction temperatures employed. The addition time can be shorter for more reactive monomers and at higher reaction temperatures. For monomers of low reactivity at a lower reaction temperature, a shorter monomer addition time may flood the system with free monomers that can form secondary polymer particles that comprise essentially no nitrocellulose phase. With longer addition times, the polymerization is carried out under monomer starvation conditions and almost all the monomers are consumed by the nitrocellulose core particles. For the preferred acrylamide or acrylate ester monomers, addition times will preferably be from about 30 to about 180 minutes.

In most cases, the monomer(s) will be added with surfactant. The amount of surfactant used will preferably be 0.5–5% based on the weight of the monomers added. Useful surfactants may be nonionic, anionic, cationic, amphoteric, oligomeric, or polymeric compounds. Especially useful surfactants are reactive surfactants. Reactive surfactants may be of any of the above classes and will contain polymerizable ethylenic unsaturation in addition to their amphiphilic moieties. Especially useful reactive surfactants are TREM® LF-40 (sold by Cognis) and the Maxemul® line of surfactants, sold by Uniquema.

In accordance with the process noted above, a preferred way to cause an addition polymerization initiator to form a free radical is by using heat. Depending on the types of initiators used, the reaction temperature can vary from about 30 to about 90° C. Preferably, the reaction temperature is at least 40° C. and most preferably, it is at least 50° C. To ensure that no free monomer is present, usually the reaction is continued for a longer time after the monomer addition. Initiator may need also to be added to scavenge remaining monomers during the final stage of the reaction to increase the reaction conversion.

Addition polymerization initiators useful in the above-described process include, for examples, an azo and diazo compounds, such as 2,2'-azobisisobutyronitrile, 2,2'-azobis (2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxyl-2,4-dimethyl valeronitrile), 2-(carbamoylazo)isobutyronitrile, 4,4'-azobis (4-cyanovaleric acid), 4,4'-azobis(2-methylpropionamidine) dihydrochloride and dimethyl-2,2'azobis isobutyrate, or peroxide compounds, such as butyl peroxide, propyl peroxide, butyryl peroxide, benzoyl isobutyryl peroxide, and benzoyl peroxide, or water soluble initiators, for example, sodium persulfate, and potassium persulfate, or any redox initiators. The initiators may be used in an amount varying from about 0.2 to 3 or 4 weight % or higher by weight of the total monomers. Usually, a higher initiator concentration results in lower molecular weights of the final polymers. In general, since nitrocellulose can act as a trap for oxygen-centered radicals, azo-type polymerization initiators, especially water-soluble azo polymerization initiators [such as 4,4'-azobis(4-cyanovaleric acid), 4,4'-azobis(2-methylpropionamidine) dihydrochloride] are preferred.

A chain transfer agent such as butyl mercaptan may also be used to control the properties of the polymer formed.

The following examples are provided to illustrate the particles and practice of the present invention, but they are not intended to be limiting of the invention in any manner.

PREPARATIVE EXAMPLES 1–3

Preparation of Aqueous Dispersions 1–3 of Core Nitrocellulose Particles

Three aqueous dispersions of nitrocellulose particles were prepared using the following procedure and the components described in TABLE I below:

Nitrocellulose (70% in isopropanol, falling ball viscosity in 20:25:55 ethanol-toluene-ethyl acetate=18–25 cps) was dissolved in 200 g of ethyl acetate. Simultaneously, the noted amount of surfactant was dissolved in 500 g of water. The two solutions were combined and emulsified, first using a Silverson L4 mixer on the highest setting then by passage twice through an M-110T Microfluidizer (sold by Microfluidics). The volatile liquids were then stripped via rotary evaporation for 15–30 minutes after the condensates were observed as coming over as a single phase (water). As cellulose nitrate is highly combustible in the dry state, the % solids were determined indirectly (via a subtractive method by Karl Fischer titration for water) to be 9.0%. Particle size analysis by photon correlation spectroscopy using an Ultrafine Particle Analyzer instrument (Microtrac UPA150) showed a median particle diameter of 0.0536 μm.

TABLE 1

| Components | Dispersion 1 | Dispersion 2 | Dispersion 3 |
| --- | --- | --- | --- |
| Cellulose nitrate A[1] (g) | 71.43 g | — | 71.5 |
| Cellulose nitrate B[2] (g) | — | 71.4 | — |
| Ethyl acetate (g) | 200.0 g | 200.0 | 200.0 |
| Alkanol XC solution[3] (g) | 75.0 | — | — |
| Dodecanethiol-endcapped acrylamide decamer[4] (g) | — | — | 75.0 |
| Uniquat CB-50 solution[5] (g) | — | 15.0 | — |
| Water (g) | 500.0 | 500.0 | 500.0 |
| Particle diameter (μm)[6] | 0.053 | 0.324 | 0.084 |
| % solids | 9.3 | 9.3 | 9.0 |

[1]Aldrich catalog #43,502-3: 11.8–12.2 wt. % nitrogen, viscosity = 18–25 cps (falling ball, 12.2 wt. % in ethanol-toluene-ethyl acetate, 25° C.), 70% in isopropanol.
[2]Aldrich catalog #43,509-0: 10.9–11.2 wt. % nitrogen, viscosity = 5–6.5 sec (falling ball, 12.2 wt. % in ethanol-toluene-ethyl acetate, 25° C.), 70% in isopropanol.
[3]Anionic surfactant-10% in water (E. I. DuPont de Nemours & Co.).
[4]This nonionic surfactant was prepared as described in U.S. Pat. No. 6,127,453 (Column 9, lines 40–55, 10% solution in water).
[5]Cationic surfactant-50% in water (available from Lonza Inc.).
[6]The particle size for Dispersion 1 was determined via photon correlation spectroscopy using an Ultrafine Particle Analyzer instrument (manufactured by Microtrac Inc.). The particle sizes for Dispersion 2 and 3 were determined via the Mie scattering method (Dispersion 1) using a Horiba LA-920 instrument (manufactured by Horiba LTD).

Example 1

Preparation of Core/Shell Particles Consisting of a Nitrocellulose Core and a Poly(t-butyl Acrylate-co-Sulfopropyl Acrylate) Shell The nitrocellulose dispersion (100 ml) of the Preparative Example 1 was dialyzed for 16 hours using a 15K cutoff membrane to remove excess surfactant. The dialyzed dispersion was combined with 0.05 g of azobiscyanovaleric acid in a 500 ml 3-neck round bottom flask equipped with a magnetic stir bar, condenser, nitrogen inlet, and a rubber septum. Through the rubber septum was inserted a length of semi-rigid plastic tubing leading to a solvent pump fed through a second round bottom flask. The flask contained a rapidly stirred monomer suspension consisting of 12.74 g of t-butyl acrylate, 0.26 g of potassium 3-sulfopropyl acrylate, 0.13 g of sodium dodecylsulfate, 26.0 g of water, and 0.05 g of azobiscyanovaleric acid (pH adjusted to 7.0 with KOH). The contents of both flasks were bubble degassed with nitrogen for 10 minutes and the reactor flask was immersed in an oil bath at 70° C. The monomer suspension was added via the solvent pump over 90 minutes. The reaction was allowed to proceed for an additional 60 minutes at 70° C., then for 16 hours at 60° C. (10.2% solids in final suspension). The median particle diameter was determined to be 0.0589 μm. The curve shape of the particle size distribution was identical to that obtained in Preparative Example 1 and slightly shifted to larger particle sizes. Examination of the particles by scanning electron microscopy showed a single distribution of particles.

Example 2

Preparation of Core/Shell Particles Having Nitrocellulose Core and a Poly(Phenyl Acrylate-co-Sulfopropyl Acrylate) Shell This particle dispersion was prepared using the identical method and components as that described in Preparative Example 2, except that 12.74 g of phenyl acrylate was used instead of the t-butyl acrylate (12.4% solids). The median particle diameter was found to be 0.0664 μm with the same retention of curve shape observed in Preparative Example 2. Examination of the particles by scanning electron microscopy showed a single distribution of particles.

Example 3

Preparation of Core/Shell Particles Having Nitrocellulose Core and a Poly(Phenyl Acrylate-co-n-Butyl Acrylate-co-Hexanediacrylate-co-Acrylamide) Shell This particle dispersion was prepared using a similar method and components as described in Preparative Example 2, except that the monomer suspension consisted of 6.05 g of n-butyl acrylate, 6.05 g of phenyl acrylate, 0.64 g of 1,6-hexanediacrylate, and 0.26 g of acrylamide. In addition, the surfactant used was TREM LF-40, an anionic reactive surfactant available from Cognis. After the addition of monomers was completed, the reaction was continued for 4 hours at 70° C. (13.3% solids). The median particle diameter was found to be 0.0861 μm with the same retention of curve shape observed in Preparative Example 2. Examination of the particles by scanning electron microscopy showed a single distribution of particles.

Demonstration of Utility:

The core-shell particles of Examples 2 and 3 were used to prepare direct-write printing plates in the following manner. Coating solutions were formulated by combining each of the aqueous core/shell particle dispersions of Examples 1 and 2 with the components listed in TABLE II below and stirring until all of the reagents had dissolved. The coating solutions were each coated onto several strips of a brush and electrochemically grained, sulfuric acid anodized, silicate post-treated 12 mil (305 μm) lithographic aluminum substrate to provide a dry coverage of 100 mg/ft$^2$ (1.08 g/m$^2$) using conventional coating equipment. The coatings were allowed to dry at room temperature for at 24 hours.

TABLE II

| Coating Solution | Core/shell Dispersion # | Dispersion (g) | IR Dye[1] (g) | LODYNE S-228[2] | PVP/VA Binder[3] | Water |
|---|---|---|---|---|---|---|
| B | 3 | 5.80 | 0.087 | 0.017 | 1.200 | 22.90 |
| C | 4 | 5.80 | 0.087 | 0.017 | 1.200 | 22.90 |

[1]See IR Dye structure below
[2]Fluorosurfactant manufactured by Ciba Chemical, Tarrytown, NY.
[3]PVP/VA S-630 is a S-630 is poly(vinylpyrrolidone-co-vinylacetate) available from ISP IR Dye structure:

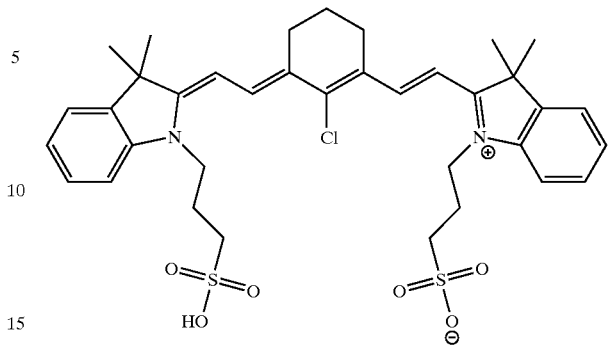

The imaging members were then thermally imaged using a commercially available Creo Trendsetter 3244 imaging device. Each resulting printing plate was patterned with three vertical stripes representing a range of net exposures (307, 451, and 615 mJ/cm$^2$). The plates were then mounted on an A. B. Dick duplicator press as pairs of corresponding overcoated and non-overcoated plates and run to 1000 impressions. In each case, the plates reached comparable printing densities by 25–50 impressions and printed with acceptable quality to 1000 impressions.

SEM evaluation: The imaged plates were examined in both the exposed and unexposed areas by scanning electron microscopy at magnifications up to 50,000×. In all cases, the imaged areas of the plates appeared as contiguous, uninterrupted surfaces while the imaged areas appeared as coatings of individual particles.

The invention has been described in detail with particular reference to certain preferred embodiments thereof, but it will be understood that variations and modifications can be effected within the spirit and scope of the invention.

I claim:

1. A combustible core-shell particle having a core comprising a nitro-resin and a shell around said core, said shell comprising an addition polymer derived, at least in part, from one or more ethylenically unsaturated polymerizable monomers that are represented by the following Structure I:

$$CH_2=C(R)-X \qquad (I)$$

wherein R is hydrogen or methyl, and X is any monovalent moiety except a phenyl group,
   wherein the weight ratio of said nitro-resin to said addition polymer shell is from about 10:1 to about 0.2:1.

2. The particle of claim 1 wherein said nitro-resin is nitrocellulose.

3. The particle of claim 1 wherein at least 80% of said core surface area is covered by said addition polymer shell.

4. The particle of claim 1 wherein X is an alkyl ester, alkyl amide, aryl ester, or aryl amide.

5. The particle of claim 4 wherein X is an alkyl ester or alkyl amide wherein said alkyl group has 1 to 6 carbon atoms.

6. The particle of claim 1 wherein R is hydrogen.

7. The particle of claim 1 wherein said monomer is t-butyl acrylate, phenyl acrylate, or sodium sulfopropyl acrylate.

8. The particle of claim 1 wherein said addition polymer shell is a polymer represented by the following Structure II:

$$-(A)_x-(B)_y- \qquad (II)$$

wherein "A" represents recurring units derived from said or more ethylenically unsaturated polymerizable monomers defined by Structure I, "B" represents recurring units derived from one or more additional ethylenically unsaturated polymerizable monomers, "x" represents from about 80 to 100 mol %, and "y" represents from 0 to about 20 mol %, based on total moles of recurring units.

9. The particle of claim 8 wherein "B" represents recurring units derived from one or more water-soluble or crosslinking ethylenically unsaturated polymerizable monomers.

10. The particle of claim 9 wherein "B" represents recurring units derived from one or more negatively or positively charged ethylenically unsaturated polymerizable monomers.

11. The particle of claim 9 wherein "B" represents recurring units derived from one or more monomers having two or more acrylates or acrylamide groups.

12. The particle of claim 8 wherein "x" is from about 90 to 100 mol %, and "y" is from 0 to about 10 mol %.

13. The particle of claim 1 wherein said addition polymer shell has a glass transition temperature of from about 25 to about 150° C.

14. The particle of claim 13 wherein said addition polymer shell has a glass transition temperature of from about 40 to about 120° C.

15. The particle of claim 1 having an average size of from about 0.03 to about 2.0 μm.

16. The particle of claim 1 wherein said addition polymer shell comprises from about 80 to about 100 mol % of recurring units derived from one or more water-insoluble acrylate ester or N-substituted acrylamides, from about 2 to about 10 mol % of recurring units derived from a water-soluble acrylate or acrylamide, and from 0 to about 10 mol % of recurring units derived from an acrylate or acrylamide crosslinking monomer.

17. A combustible core-shell particle having a core comprising a nitrocellulose and an addition polymer shell completely covering said core, said addition polymer shell comprising, at least in part, a poly(acrylate ester), poly(methacrylate ester), poly(acrylamide), or poly(methacrylamide), and wherein the weight ratio of said nitrocellulose core to said addition polymer shell being from about 0.5:1 to about 5:1.

18. A method of making a combustible core-shell particle having a core comprising a nitro-resin and a shell around said core, said shell comprising an addition polymer derived, at least in part, from one or more ethylenically unsaturated polymerizable monomers that are represented by the following Structure I:

$$CH_2=C(R)\text{-}X \qquad (I)$$

wherein R is hydrogen or methyl, and X is any monovalent moiety except a phenyl group, said method comprising:

A) preparing an aqueous surfactant-stabilized dispersion of particles of said nitro-resin, and B) providing an addition polymer shell around said nitro-resin particles by emulsion polymerizing said one or more monomers represented by Structure I on said nitro-resin particles.

19. The method of claim 18 wherein said nitro-resin particles are prepared by solvent evaporation.

20. The method of claim 18 wherein said addition polymer shell is provided around said nitro-resin particles semi-continuously.

21. The method of claim 18 wherein said surfactant-stabilized dispersion of particles has a solids content of from about 5 to about 30%, and said one or more monomers are present in said emulsion polymerizing in an amount of from about 0.5 to about 5% (by weight).

22. The method of claim 18 wherein said emulsion polymerizing is carried out in the presence of a water-soluble azo polymerization initiator.

* * * * *